United States Patent [19]

Barry et al.

[11] Patent Number: 4,761,869

[45] Date of Patent: Aug. 9, 1988

[54] BAR-TYPE PULLER

[75] Inventors: Gerald E. Barry; James L. Sandberg, both of Owatonna, Minn.

[73] Assignee: Owatonna Tool Company, Owatonna, Minn.

[21] Appl. No.: 64,681

[22] Filed: Jun. 22, 1987

[51] Int. Cl.[4] .......... B23P 19/04
[52] U.S. Cl. .......... 29/261
[58] Field of Search .......... 29/259–262; 269/171

[56] References Cited

U.S. PATENT DOCUMENTS

| | | | |
|---|---|---|---|
| 1,260,369 | 3/1918 | Goddard | 29/261 |
| 1,584,855 | 5/1926 | Eisenhuth . | |
| 1,709,913 | 4/1929 | Kaplan . | |
| 1,777,616 | 10/1930 | Hommel . | |
| 4,381,105 | 4/1983 | Goff et al. | 269/171 |

FOREIGN PATENT DOCUMENTS

| | | | |
|---|---|---|---|
| 1093747 | 12/1955 | Fed. Rep. of Germany | 29/261 |
| 89451 | 6/1957 | Norway | 29/261 |

OTHER PUBLICATIONS

Pages 174 and 175 of a Copyright 1982 Catalog of Ingersoll–Rand Company Hand Tool Division.

Page 9 of Federal Specification No. GGG–P–7810, dated Jan. 11, 1966.

Pages 208, 209 and 228 of a 1983 Catalog of Snap–On Tools Company.

*Primary Examiner*—Robert C. Watson
*Attorney, Agent, or Firm*—Wood, Dalton, Phillips, Mason & Rowe

[57] ABSTRACT

A bar-type puller having a cross block with a central section and a pair of end sections with a forcing screw threadably mounted in the central section. A pair of work-engaging members, such as pulling jaws, can be radially and axially adjustably mounted on the cross block by end sections of the cross block having spaced-apart arms to define spaces therebetween which receive the work-engaging members for infinite lateral adjustment along the arms. The work-engaging members have spaced-apart pins which span the top and bottom of the arms, with a slight clearance to facilitate lateral adjustment. The pins are caused to move into binding relation with the cross block when the work-engaging members are under load to lock the members in radially adjusted position. There is also provision for axial adjustment by providing additional spaced pins on the work-engaging members providing an alternate mounting location for the members to the cross block.

4 Claims, 1 Drawing Sheet

FIG. 1
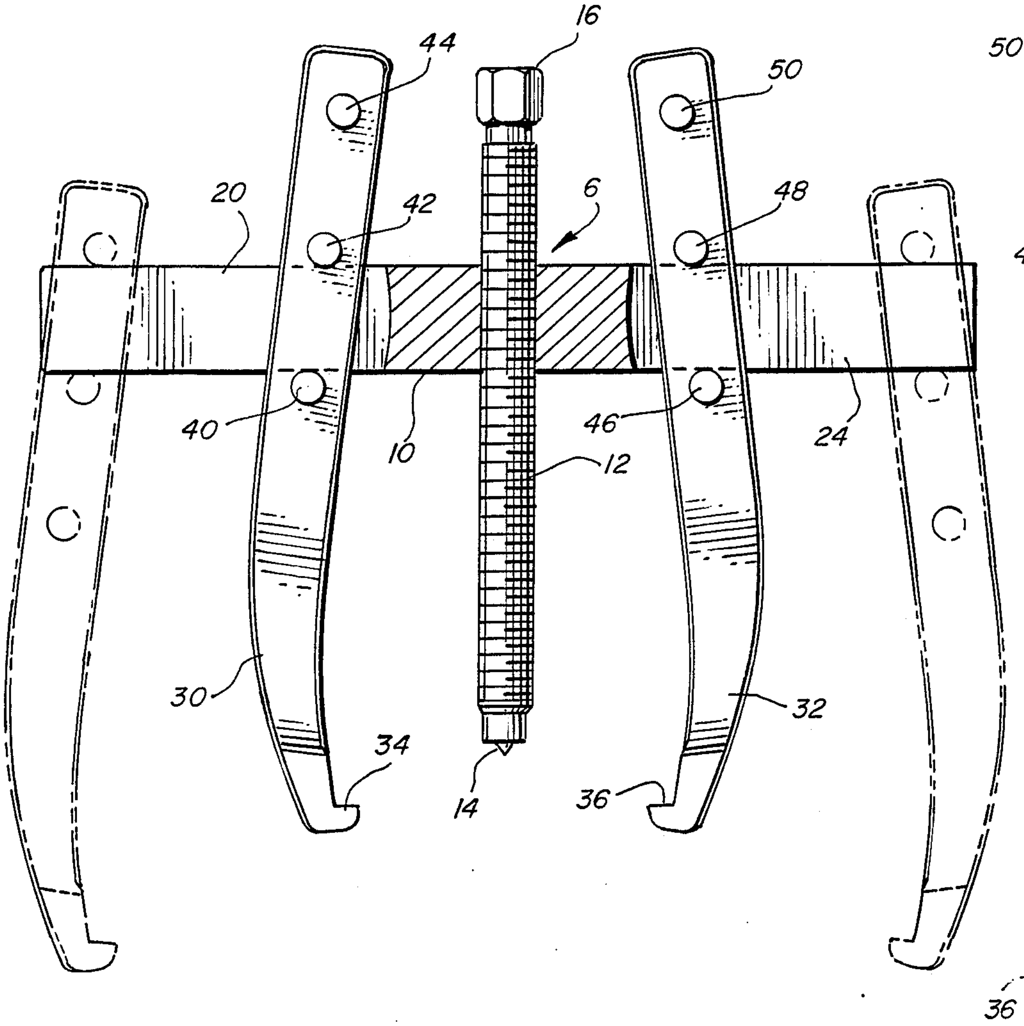
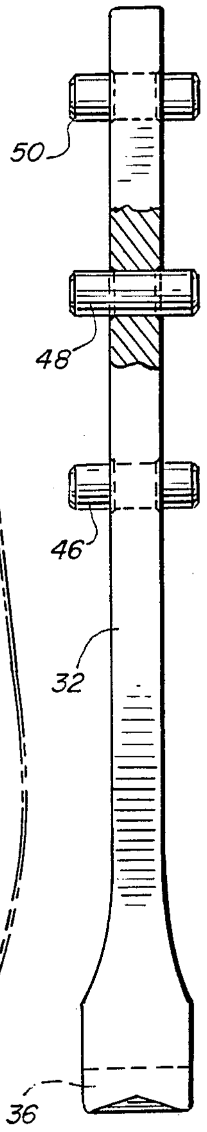
FIG. 3
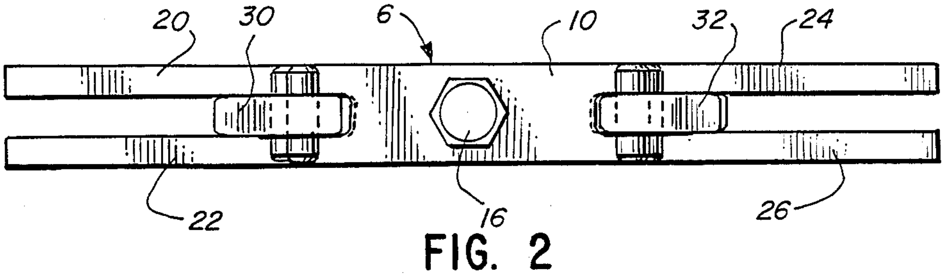
FIG. 2

BAR-TYPE PULLER

FIELD OF THE INVENTION

This invention relates to a strong, rugged, bar-type puller having a minimum number of parts and which is constructed for ease of assembly and adjustment and for self-locking under load to safely maintain the parts in adjusted position.

BACKGROUND OF THE INVENTION

The business of applicants' assignee started many years ago with manufacture of a gear puller, generally as shown in the Kaplan U.S. Pat. No. 1,709,913, wherein a pair of pivotally-mounted pulling jaws are associated with a forcing screw. The pulling jaws are pivotally mounted intermediate their ends on links which are pivoted to a cross block with the structure providing for self-locking in operation and having a range of adjustment. The pulling jaws have different shaped hooks at opposite ends thereof and the structure could be disassembled for rearrangement of the pulling jaws to enable use of the alternately usable hooks.

Other types of pullers, or similar structures, are known in the prior art. The Hommel U.S. Pat. No. 1,777,616 discloses a work support wherein a plurality of bars having hooks at an end may be loosely supported in radial slots in a member associated with a press and with the bars being both radially and axially adjustable. The structure provides for incremental, rather than infinite radial, adjustment and does not achieve a locking action of the bars when the bars are under load.

A puller having pulling jaws and a cross block held in assembled relation by a structure including pins on a pulling jaw and the cross block is shown in U.S. Pat. No. 1,584,855.

A commercially available puller has a cross member with two or more arms extending from a central section having a threaded forcing screw. Pulling jaws with slots spaced along their length can be fitted onto the cross member by an interfitting association of an arm with a slot in the jaw. Also known, are pullers having a cross member and with a pulling jaw having a jaw block at its upper end with a slot for fitting of a jaw block onto an arm of the cross member.

The prior art known to applicants has not had a bar-type puller comprising a cross block having a central section for threadably receiving an adjustable forcing screw and a pair of end sections which are slotted to provide spaced-apart arms and with spaces therebetween open at one end, a pair of pulling jaws positioned radially relative to the forcing screw at any desired location in said spaces along the length of the arms, at least two spaced-apart pins on each pulling jaw extending from opposite sides thereof to span the tops and bottoms of the arms and with the pins being spaced apart only a slight distance greater than the height of the arms to permit radial movement but locking the pulling jaw when under load because of a slight canting of the pulling jaw which brings the pins into locking relation with the arms. The bar-type puller construction also enables easy reversal of the pulling jaws for internal pulling.

SUMMARY OF THE INVENTION

A primary feature of the invention is to provide a bar-type puller having a limited number of easily-manufactured parts and which provides good axial and lateral adjustment as well as a locking action under load to maintain the pulling jaws in adjusted position.

An object of the invention is to provide a bar-type puller having the features set forth in the preceding paragraph and which enables easy reversal of the pulling jaws for internal pulling.

Still another object of the invention is to provide a bar-type puller having a cross block with a pair of arm sections at opposite ends thereof formed as spaced-apart arms to provide a space therebetween which is open at an outer end for each space to receive a work-engaging member which can be inserted into the space and with each work-engaging member having at least a pair of pins spaced apart along the length of the work-engaging member and at a distance slightly greater than the height of said arms. The work-engaging members can be infinitely adjustable radially of the arms and the forces exerted when the work-engaging members are under load causes a slight canting of the work-engaging members to bring the pins into locking engagement with the arms to hold the work-engaging members locked in the adjusted radial position.

Still another object of the invention is to provide a bar-type puller as defined in the preceding paragraph wherein there are at least three pins on each work-engaging member to provide two different axial mountings of a work-engaging member to the cross block at two different locations lengthwise of the work-engaging member.

Still another object of the invention is to provide a bar-type puller having an elongate cross block with a central section and a pair of end sections, a forcing member adjustable in said central section, each of said end sections being defined by a pair of integral spaced-apart arms defining an elongate space therebetween open at one end, a pair of elongate work-engaging members positioned one in each of said elongate spaces to extend therefrom in spaced generally parallel relation to the forcing member, and a pair of pins spaced-apart along the length of and fixed to each work-engaging member with the pins extending outwardly from opposite faces of a member a distance sufficient to span said arms, said spacing between pins being only slightly greater than the height of said arms to provide a small clearance to enable easy adjustment of the member lengthwise of the cross block, the slight clearance enabling the member to be locked to and held against rotation by a slight tilt of a member to engage one pin from each pair with the top of said arms and one pin from each pair with the bottom of said arms.

An additional object of the invention is to provide a bar-type puller having a cross block with a central section and a pair of end sections, a forcing screw extending perpendicular to said central section and threadably adjustable therein and having a length to extend outwardly from opposite faces of the central section and having one end engageable with a structure, said end sections each being defined by a pair of spaced-apart arms defining an elongate space therebetween with the centerline of the elongate spaces passing through the axis of the forcing screw, a pair of elongate pulling jaws positioned one in each of said elongate spaces to extend therefrom in spaced generally parallel relation to the forcing screw for engagement with a component to be separated from said structure, and a pair of pins spaced apart along the length of and fixed to each pulling jaw with the pins of a pair extending outwardly from opposite faces of a pulling jaw a distance sufficient to span said arms, each of said pulling jaws having a hook offset inwardly from a line passing through the centers of said pair of pins, said spacing between pairs of pins being slightly greater than the height of said arms to enable easy assembly of a pulling jaw with the cross block and radial adjustment of the pulling jaw lengthwise of the cross block with the pulling jaw locked to and held against rotation by a slight tilt of a pulling jaw resulting from a pull on the pulling jaws as the forcing screw is forced against said structure to engage one pin from each pair with the top of said arms and one pin from each pair with the bottom of said arms.

DESCRIPTION OF THE DRAWINGS

FIG. 1 is a front central vertical section of the bar-type puller and showing an alternate location of the pulling jaws in broken line;

FIG. 2 is a plan view of the structure shown in FIG. 1; and

FIG. 3 is an elevational view of a pulling jaw on an enlarged scale and with a part thereof broken away.

DESCRIPTION OF THE PREFERRED EMBODIMENT

The bar-type puller has a cross block 6 formed from generally square stock having a central section 10 which threadably receives a forcing screw 12 extending beyond the upper and lower faces of the cross block. One end 14 of the forcing screw has a centering point for engagement with the structure to which a force is to be applied. The forcing screw has a hex head 16 at its opposite end for engagement by a suitable tool to impart rotation to the forcing screw whereby the forcing screw may move axially relative to the cross block.

The cross block 6 has a pair of end sections extending oppositely from the central section 10, with one end section having a pair of arms 20 and 22 which are spaced apart to provide a space therebetween having an outwardly-open end. The other end section has a pair of integral spaced-apart arms 24 and 26, defining a space therebetween open at its outer end. As seen in FIG. 2, the center line of the elongate spaces passes through the axis of the forcing screw 12.

A pair of work-engaging members is associated with the end section of the cross block. These work-engaging members are in the form of pulling jaws 30 and 32 which are of an elongate slender construction, with a thickness only slightly less than the width of the space between the arms of an end section, so as to permit free radial movement, but without sloppiness in the fit. In a commercial embodiment, the width of the space is approximately 0.55 inch, while the thickness of the work-engaging members is approximately 0.500 inch.

The pulling jaws 30 and 32 each have a hook 34 and 36, respectively, at an end thereof for engagement with a component to be moved relative to a structure engaged by the forcing screw. A pulling jaw also has a series of three spaced-apart pins, with the pulling jaw 30 having the pins 40, 42 and 44 and the pulling jaw 32 having the pins 46, 48 and 50. The pins extend outwardly from opposite faces of a pulling jaw a distance sufficient to span the arms of an end section of the cross block. The three pins of a pulling jaw define two pairs of pins and, resultingly, two different axially-varying mounting positions for a pulling jaw. As seen in FIG. 1, the pulling jaws 30 and 32 have the respective pins 40 and 46 positioned beneath the end sections of the cross block and have the respective pins 42 and 48 positioned above the end sections of the cross block. The spacing between a pair of pins is only slightly greater than the height of the arms of an end section so that, when a pulling jaw is in an upright position, there is a limited clearance between the pair of pins and the upper and lower faces of the end section arms to permit radial adjustment of a pulling jaw. In one commercial embodiment, the space between pins is approximately 1.4" and the height of the cross block is approximately 1.37". These dimensions will differ in other commercial embodiments of differing size. There is a canting of the pulling jaws, when under load, to bring the pins at opposite faces of the cross block end sections into binding relation with the tops and bottoms of the arms to lock the pulling jaw in radially adjusted position. This canting action when under load results from the hooks 34 and 36 being offset from a line extended through the centers of the pins.

When the reach of the pulling jaws is to be increased, they may be moved radially outward to be free of the end sections of the cross block and then moved to positions to align the end sections with the space between the pins 42–44 and 48–50 and then the pulling jaws can be reassembled on the cross block.

With the series of spaced-apart pins, there is simple axial adjustment of the pulling jaws and the structure enables easy assembly and radial adjustment and with locking of the pulling jaws in position when under load. An alternate location for the pulling jaws is shown in broken line in FIG. 1. In the broken line position, the reach of the pulling jaws has been increased and the pulling jaws are at a maximum laterally adjusted position.

Although the work-engaging members specifically shown in the drawings comprise a pair of pulling jaws of a type having hooks at one end, it will be evident that different types of pulling jaws or other work-engaging members can be used for special applications. The mounting of the pulling jaws enables easy reversal of the pulling jaws for internal pulling.

We claim:

1. A bar-type puller having a cross block with a central section and a pair of end sections, a forcing screw extending perpendicular to said central section and threadably adjustable therein and having a length to extend outwardly from opposite faces of the central section and having one end engageable with a structure, said end sections each being defined by a pair of spaced-apart arms defining an elongate space therebetween with the centerline of the elongate spaces passing through the axis of the forcing screw, a pair of elongate pulling jaws positioned one in each of said elongate spaces to extend therefrom in spaced generally parallel relation to the forcing screw for engagement with a component to be separated from said structure, and a pair of pins spaced apart along the length of and fixed to each pulling jaw with the pins of a pair extending outwardly from opposite faces of a pulling jaw a distance sufficient to span said arms, each of said pulling jaws having a hook offset inwardly from a line passing through the centers of said pair of pins whereby a pull on the hook causes a tilt of the jaw, said spacing between pairs of pins being only slightly greater than the height of said arms to provide limited clearance between a pair of pins and said arms to enable easy assembly of a pulling jaw with the cross block and radial adjustment of the pulling jaw lengthwise of the cross block, said limited clearance being taken up by a slight tilt of a pulling jaw resulting from a pull on the pulling jaws as the forcing screw is forced against said structure to bindingly engage one pin from each pair with the top of said arms and one pin from each pair with the bottom of said arms to lock the pulling jaw in position.

2. A bar-type puller as defined in claim 1 wherein each pulling jaw has three pins to define two pairs of said spaced-apart pins to enable mounting of a pulling jaw to said cross block at two different locations along the length of a pulling jaw.

3. A bar-type puller having an elongate cross block with a central section and a pair of end sections, a forcing member adjustable in said central section, each of said end sections being defined by a pair of integral spaced-apart arms defining an elongate space therebetween open at one end, a pair of elongate work-engaging members positioned one in each of said elongate spaces to extend therefrom in spaced generally parallel relation to the forcing member, a pair of pins spaced-apart along the length of and fixed to each work-engaging member with the pins extending outwardly from opposite faces of a work-engaging member a distance sufficient to span said arms, said spacing between pins being only slightly greater than the height of said arms to provide a small clearance to enable easy adjustment of the work-engaging member lengthwise of the cross block, the slight clearance enabling the work-engaging member to be locked to and held against rotation by only a slight tilt of the work-engaging member to engage one pin from each pair with the top of said arms and one pin from each pair with the bottom of said arms, and each of said work-engaging members having a hook inwardly offset from a line extending through the pair of pins on the work-engaging member whereby a load on the hook causes said slight tilt to lock the work-engaging member to the cross block.

4. A bar-type puller as defined in claim 3 wherein there are three of said spaced-apart pins to enable mounting of a work-engaging member to said cross block at two different locations along the length of a work-engaging member.

* * * * *